J. DAVIS.
AUTOMATIC CAR-BRAKE.
No. 7,312. Reissued Sept. 19, 1876.
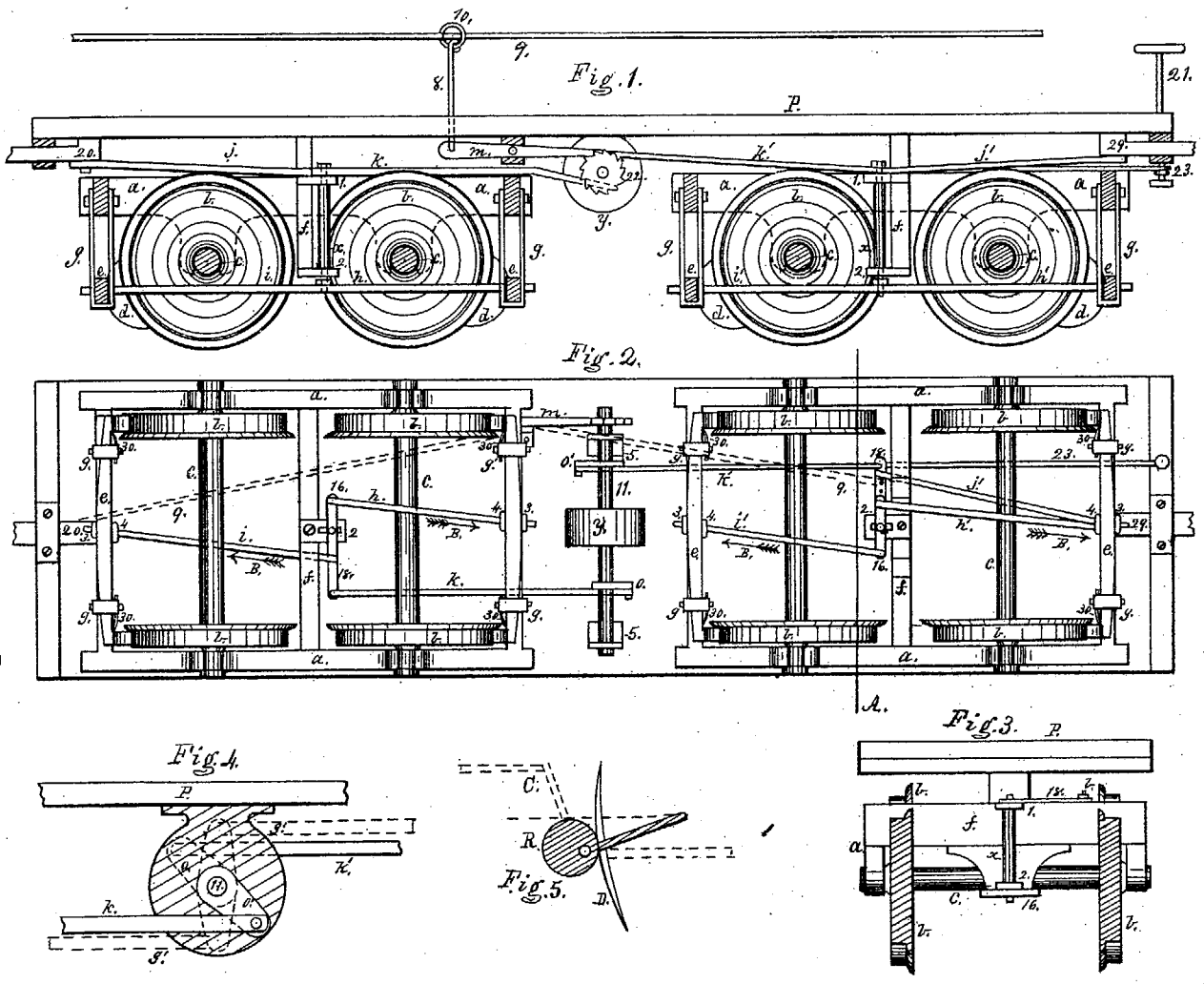
Witnesses
James I. Johnston
A. J. Davis
Inventor
John Davis.
By Johnston & Donn,
his attorneys.
N. PETERS, PHOTO-LITHOGRAPHER, WASHINGTON, D. C.

UNITED STATES PATENT OFFICE.

JOHN DAVIS, OF ALLEGHENY, PENNSYLVANIA.

IMPROVEMENT IN AUTOMATIC CAR-BRAKES.

Specification forming part of Letters Patent No. 55,067, dated May 29, 1866; reissue No. 3,532, dated July 6, 1869; reissue No. 7,312, dated September 19, 1876; application filed July 11, 1876.

DIVISION A.

*To all whom it may concern:*

Be it known that I, JOHN DAVIS, of the city and county of Allegheny, and State of Pennsylvania, have invented certain new and useful Improvements in Brakes for Railway-Cars, which were shown in the drawings forming part of the Letters Patent No. 55,067, granted to me May 29, 1866, and subsequently reissued July 6, 1869, No. 3,532, which improvements I now desire to divide into two parts, designated Division A and Division B, and secure each division by a separate patent, as provided for by the act of Congress; and I do hereby declare that the following is a full, clear, and exact description of that part of my improvement which is embraced in Division A, reference being had to the accompanying drawings, and to the letters of reference marked thereon.

In Division A, my invention consists in applying the brakes to the wheels of railway-cars, so as to make them operative by the action of the locomotive and cars, whether said action is obtained while traveling on a level or inclined track, said brakes, through the medium of the hereinafter-described mechanism and said action, always operating with relation to the car-wheels, so that they will adjust themselves, and bring the proper force to bear on the wheels when the locomotive or cars become inoperative from any cause, or from any undue or improper motion or action imparted to them.

To enable others skilled in the art with which my invention is most nearly connected to make and use it, I will proceed to describe its construction and operation.

In the accompanying drawings, which form part of my specification, Figure 1 is a vertical and longitudinal section of a pair of car-trucks furnished with my improvement. Fig. 2 represents the car-trucks inverted, showing the general arrangement of the several parts of my improvement in brakes for railway-cars. Fig. 3 represents a transverse section of a car-truck at line A of Fig. 2. Fig. 4 represents a section of the car-truck, showing the position of the spring-shaft when the brakes are on and off the wheels. Fig. 5 represents a combination of a cam and lever, which can be used, in combination with an elliptic spring, as a substitute for the coil-spring and spring-shaft hereinafter described.

In the accompanying drawings, *a* represents the truck-frame, *b* the wheels, *c* the axle, *d* the brakes, *e* the brake-bars, 20 and 29 the draw-heads, and P the floor of the car-body, all of which parts are of ordinary construction.

To the cross-bar *f* of the truck-frame *a* are secured two bearings, 1 and 2, which support the perpendicular shafts *x*, on the upper end of which are levers 18, and to the lower end of which is secured lever 16, to which are attached rods *i h i′ h′*. The rods *j j′* are secured to the draw-heads 20 and 29, and the rods *k* and *k′* are secured to cranks *o* and *o′* on the spring-shaft 11, held in the desired position by hangers 5, secured to the bottom P of the car-body.

To the spring-shaft 11 is attached a coil-spring placed in the case *y*, secured to the bottom P of the car-body. One end of the coil-spring is attached to the spring-shaft 11, and the other end of it to side of case *y*. On the end of the spring-shaft 11 is secured a ratchet-wheel, 22, which is connected with a pawl, *m*, pivoted to the bottom of the car, and used for holding the brakes off the wheels, when so desired.

To the end of the pawl *m* is attached a cord, 8, which passes up the side of the car-body. On the upper end of the cord 8 is a ring, 10, through which passes a cord, 9, which, with the usual bell-rope, passes out at the end of the car, leading from thence to the locomotive, so as to be under the control of the engineer.

The lower ends of the shafts *x* are placed in a slot made in the bearings 2, so that the shaft *x* can move back and forward with the movements of the brakes. The brakes *d* are held from the wheels by means of springs 30, secured to the brake-bars *e*, and which press against the stirrups *g*.

The combination of the cam R and levers C, with the elliptic spring D, (shown in Fig. 5,) can be readily substituted for the coil-spring shaft 11 and cranks *o* and *o'*, and about the same result obtained, therefore I do not confine myself to the use of the coil-spring shaft and cranks for operating the rods, levers, and brakes.

The ordinary means for suspending the brake-bars *e* may be employed; but in the present case, I use for that purpose the stirrups *g*, which will be more fully described in my application, Division B.

The construction and arrangement of the several parts of my improvement will be readily understood from the foregoing description, and by reference to the accompanying drawings. I will therefore proceed to describe the operation of my invention: Having the various parts constructed and arranged as hereinbefore described, I adjust the brakes to the wheels by means of the screw-nuts 3 and 4. I then turn the shaft 11 until the coil-spring has sufficient tension to hold the brakes against the wheels with the desired force. I then attach the rods *k* and *k'* to the cranks or levers *o* and *o'*. I then couple the cars and locomotive together in the usual manner. By coupling the locomotive to the draw-heads 20, the draft of it will draw forward the rods *j* and *k*, and crank *o*, which will force back the crank *o'* and rods *k'* and *j'*, which movements of rods and cranks will move the levers 18, which will turn the shaft *x* and lever 16, which will move the rods *i h i' h'* in the dition indicated by the arrows B, and thereby force the brakes off the wheels. When the drawing power is attached to the draw-heads 29, the draft will draw forward the rods *j'* and *k'* and the crank *o'*, which will force back the rods *k* and *j* and crank *o*, which will operate the levers 18 and 16, which will move the rods *i i' h h'* in the direction indicated by the arrows B, and thereby force the brakes off the wheels.

When I desire to take the brakes off the wheels, and hold them off, a forward motion is given to the locomotive, which will draw forward the draw-heads, and operate the rods, cranks, and levers in the manner described, and thereby take off the brakes. I then draw forward the cord 9, which will draw up the cord 8, which will bring the pawl *m* in contact with the ratchet-wheel 22, and thereby hold the brakes off the wheels.

My improvement in brakes can be operated by the ordinary hand-lever 21 and chain 23, which is attached to lever 18. By winding up the chain, through the medium of lever 21, it will cause the rods, cranks, and levers to operate, as hereinbefore described.

The brakes are brought to bear on the wheels by the tractive power of the coil-spring upon the shaft 11 and the cranks *o* and *o'*, connected to the rods and levers which operate the brakes. When the brakes are off the wheels, the cranks *o* and *o'* are in the position represented by the dotted lines *g'*, (shown in Fig. 4,) and when the brakes are on the wheels, the cranks *o* and *o'* are in the position represented at *o* and *o'* in the same figure.

By thus arranging the cranks *o* and *o'* with relation to the spring and shaft 11, a less power will hold the brakes off the wheels than is required to draw them off, for the leverage of the cranks *o* and *o'* is gradually increased as they approach the position represented by the dotted lines *g'* in Fig. 4, which is the position of the cranks when the brakes are held off the wheels.

Having thus described my improvement in car-brakes, what I claim as of my invention, is—

1. The combination of the cranks *o* and *o'* on the spring-shaft 11 of the improved brake, substantially as herein described and set forth.

2. The combination of the pawl *m* and ratchet-wheel 22 with the shaft 11, cranks *o* and *o'*, and coil-spring, combined, arranged, and operating substantially as herein described, and for the purpose set forth.

3. The combination and arrangement of the coil-spring shaft 11, cranks *o* and *o'*, rods *j k j'* and *k'*, levers 18 and 16, and shaft *x*, with the rods *i i' h h'*, brake-bars *e*, and brakes *d*, constructed, combined, arranged, and operating as herein described.

JOHN DAVIS.

Witnesses:

JAMES J. JOHNSTON,
A. J. DAVIS.